April 22, 1941.  J. A. FOTIE  2,239,418

ADJUSTABLE ELECTRODE BRACKET FOR WELDING MACHINES

Filed July 1, 1940

INVENTOR.
Joseph A. Fotie
BY Hoary Hamilton
ATTORNEYS

Patented Apr. 22, 1941

2,239,418

UNITED STATES PATENT OFFICE 2,239,418

ADJUSTABLE ELECTRODE BRACKET FOR WELDING MACHINES

Joseph A. Fotie, Kansas City, Mo.

Application July 1, 1940, Serial No. 343,412

5 Claims. (Cl. 219—4)

This invention relates to the art of welding and particularly spot welding machines wherein a pair of electrodes are employed, and the primary object is the provision of an adjustable electrode bracket for such equipment that will supply an adequate amount of current, regardless of the relative position of the parts of said bracket.

One of the salient objects of this invention is to provide an adjustable electrode bracket for welding machines having as a part thereof, a specially formed electrical conductor so that the movable element of the bracket lies in close proximity to a source of current, regardless of the position assumed as a result of the operator's adjustment thereof.

Heretofore, brackets for holding electrodes of spot welding machines have been movable through a range of positions, but the current necessary in the operation of the welder has been diminished as the movable part of the adjustable bracket, leaves the point of connection between the bracket and the conductor. Efforts have been made to supply flexible conductors for the movable parts of adjustable electrode holders, but without success due to the extremely heavy nature of the conductor and the resulting effort required to manually manipulate the parts.

It is an important object of this invention therefore, to provide an adjustable bracket which includes means for positively supplying an even, adequate and constant supply of current to a movable bearing, forming a part of the assembly, throughout all possible positions of said bearing.

This invention contemplates a large number of minor objects, which will become apparent to one skilled in the art during an understanding of the following specification, referring to the accompanying drawing, wherein.

Figure 1:
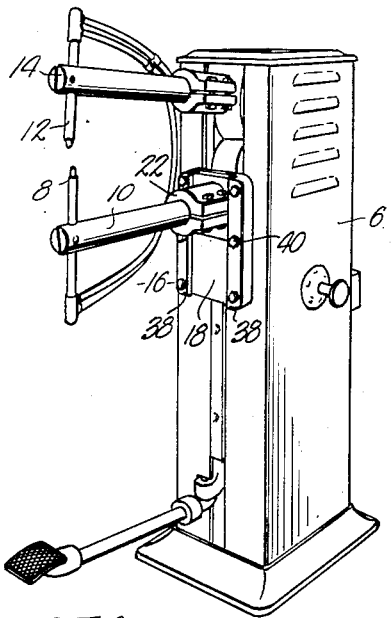
Figure 1 is a perspective view of a welding machine equipped with an adjustable electrode bracket embodying the present invention.
Figure 2:
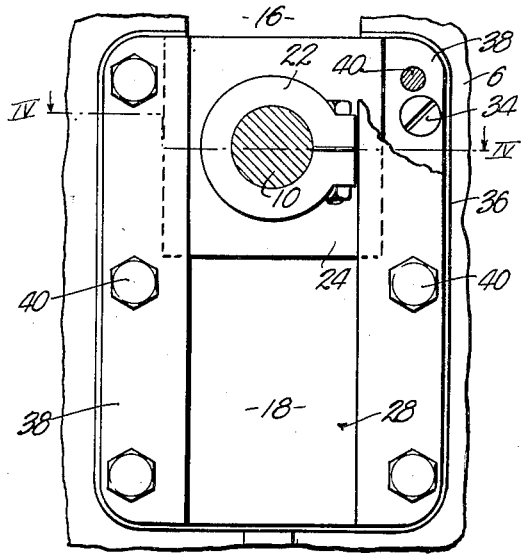
Fig. 2 is a fragmentary detailed elevational view of the bracket.
Figure 3:
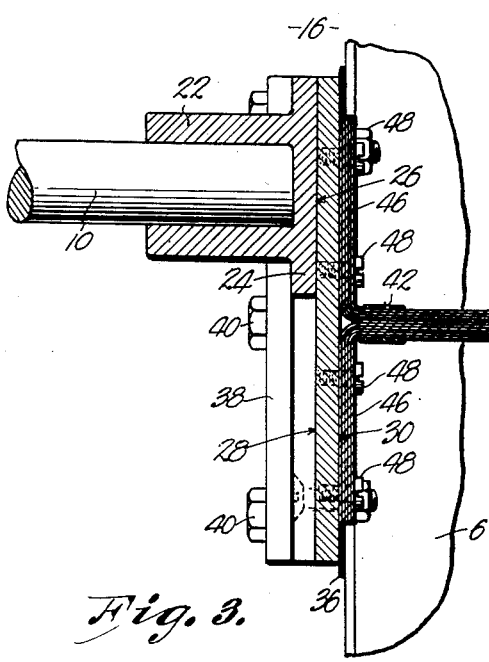
Fig. 3 is a vertical longitudinal sectional view through the bracket, illustrating the manner in which the electrical conductor is flared for attachment.
Figure 4:
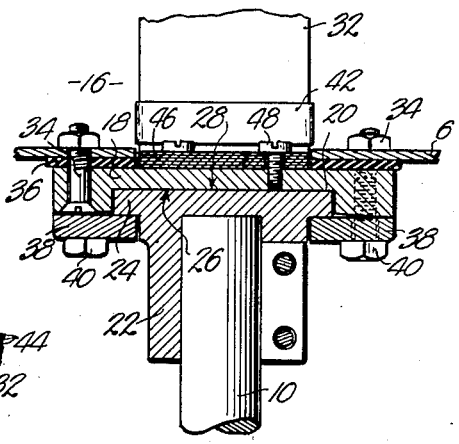
Fig. 4 is a cross sectional view taken on line IV—IV of Fig. 2.

Welding machines with which the bracket contemplated is used, have a case 6, an electrode 8, and a horn 10 to one end of which the electrode 8 is secured. Another electrode 12, secured to horn 14, is swingably mounted for movement toward and from electrode 8 and the distance between electrodes 8 and 12 should be determined in view of the character of work to be performed.

In practically all instances, it is desirable to have lower electrode horn 10 movable toward and from upper electrode horn 14. To accomplish this end and yet to supply an adequate amount of current to electrode 8, the adjustable bracket, generally designated by the numeral 16, is provided.

This bracket 16 comprises a base 18 provided with a groove 20 which extends from end-to-end along the longitudinal central line of the base. This base as well as bearing 22, is constructed of metal that is a very good conductor of electricity, for one end of horn 10 fits into bearing 22 so that current is carried to electrode 8 thereby.

Bearing 22 has a block portion 24 integral therewith that rides in groove 20. Bearing 22 has a planar surface 26 thereon which lies against one planar face 28 of base 18. Another planar face 30 is formed along the opposite side of base 18 and it is against this face 30 that the hereinafter described laminated, flared conductor 32 is secured.

Bolts or similar means 34 serve to hold base 18 in position on case 6 of the machine. A sheet of insulating material 36 should be interposed between base 18 and case 6 so as to electrically isolate all of the parts of the bracket.

A pair of jaws 38 secured to base 18 by machine-screws or the like 40, overhang the marginal edges of block 24, forming a part of bearing 22, and when machine-screws 40 are tightened, bearing 22 is held against movement.

The planar surface 26 on bearing 22 is relatively small in area, as compared to the area of planar face 28 of base 18. A considerable amount of movement is possible therefore, without removing bearing 22 from complete contact with the face 28.

Conductor 32 comprises superimposed strips of copper or other material that is a good conductor of electricity. A collar 42 circumscribes conductor 32 at a point spaced inwardly from one end thereof, and a desired number of strips 44 forming the body of conductor 32, are bent outwardly at collar 42 to lie against the smooth face 30 of base 18. These outwardly directed portions 46 of conductor 32 are fastened tightly against base 18 by screws or the like 48, and current passing through conductor 32 will be evenly distributed throughout the body of the base 18 to enter bearing 22, regardless of its position.

Bearing 22 will lie in opposed relation with a part of the flared end of conductor 32 at all times and therefore, an adequate supply of current will always be available to electrode 8.

The advantages arising from an adjustable electrode bracket of the character illustrated and described are apparent to one skilled in the art, and while the preferred embodiment has been shown, it is desired to be limited only by the spirit of the invention and scope of the appended claims.

Having thus described the invention, what is claimed as new and desired to be secured by Letters Patent is:

1. In a welding machine of the character described, an adjustable electrode bracket comprising a base secured to the case of the machine; a bearing for the electrode horn of the machine; adjustable means for securing the bearing in place against one side of the base; and a current conductor secured to another side of the base, said current conductor having a number of elements extending outwardly from a point to cover a major portion of the area of the said other side of the base.

2. In a welding machine of the character described, an adjustable electrode bracket comprising a base secured to the case of the machine; a bearing for the electrode horn of the machine; adjustable means for securing the bearing in place against one side of the base; a laminated current conductor secured to the other side of the base, said current conductor having the laminations thereof divided into groups near the end thereof, each of the said groups extending outwardly from a common point along the said other side of the base to cover a major portion of the area thereof.

3. An electrode bracket for welding machines comprising a base having a pair of planar opposite faces formed thereon; a bearing having a planar surface in engagement with one of the faces of the base; adjustable means for securing the bearing in place in a selected position against the base; and a current conductor having a flared end covering a major portion of the other planar face of the base, said conductor being flared outwardly from a central point on the said other face of the base whereby to establish a current supply directly to the bearing through the base in all possible positions of the bearing.

4. An electric bracket for welding machines comprising a base having a flat, smooth surface on one side thereof and provided with a longitudinal groove with a flat smooth bottom on the opposite side thereof; a bearing having a flat surface on one side thereof slidably mounted in the groove; means for securing the bearing in position along the groove; a current conductor; and flat portions on the conductor extending outwardly therefrom in diametrically opposite directions along the flat, smooth surface of the first mentioned side of the base, said flat surface of the bearing being smaller in area than the bottom of the groove, the combined length of the flat portions of the conductor being substantially as long as the said groove and positioned in opposed relation thereto whereby the bearing is opposite the outwardly extending portions in all possible positions in the groove.

5. In a welding machine of the character described, a casing, stationary and adjustable electrode carrying horns supported by the casing, the support of the adjustable horn comprising a base plate mounted on the casing, a bearing on the horn slidable on the base plate, current conductors for supplying current to the respective horns, the conductor supplying current to the adjustable horn having a connection to the base plate, said connection comprising an enlargement in the surface area of the conductor and adapted to furnish current uniformly to the base plate and adjustable horn in any of its adjusted positions.

JOSEPH A. FOTIE.